United States Patent [19]

Sugino et al.

[11] Patent Number: 5,590,732

[45] Date of Patent: Jan. 7, 1997

[54] ELECTRICALLY ASSISTED POWER STEERING SYSTEM FOR MOTOR VEHICLES

[75] Inventors: Mitsutaka Sugino; Yasuo Shimizu, both of Saitama, Japan

[73] Assignee: Honda Giken Kogyo Kabushiki Kaisha, Tokyo, Japan

[21] Appl. No.: 281,183

[22] Filed: Jul. 27, 1994

[30] Foreign Application Priority Data

Jul. 29, 1993 [JP] Japan .................................. 5-187858

[51] Int. Cl.$^6$ ..................................................... B62D 5/04
[52] U.S. Cl. ........................ 180/444; 180/412; 180/427; 180/428
[58] Field of Search ................................... 180/147, 148, 180/79.1, 427, 412, 428, 443, 444

[56] References Cited

U.S. PATENT DOCUMENTS

| 4,666,014 | 5/1987 | Carlson et al. | 180/444 |
| 4,735,271 | 4/1988 | Shimizu | 180/79.1 |
| 4,742,882 | 5/1988 | Shimizu et al. | 180/79.1 |
| 4,773,497 | 9/1988 | Carlson et al. | 180/148 |
| 5,083,626 | 1/1992 | Abe et al. | 180/79.1 |
| 5,135,067 | 8/1992 | Kohata et al. | 180/79.1 |

FOREIGN PATENT DOCUMENTS

| 3248964 | 11/1991 | Japan | 180/147 |
| 876313 | 7/1958 | United Kingdom . | |
| 2198098 | 10/1987 | United Kingdom . | |

Primary Examiner—Kevin Hurley
Assistant Examiner—F. Zeender
Attorney, Agent, or Firm—Armstrong, Westerman, Hattori, McLeland & Naughton

[57] ABSTRACT

An electrically assisted power steering system for a motor vehicle includes a housing, a shaft slidably supported in the housing, a ball-and-nut mechanism operatively mounted on the shaft, and an electric motor mounted in the housing for transmitting rotary force from the electric motor through the ball-and-nut mechanism to the shaft. The ball-and-nut mechanism including a nut assembly disposed around the shaft and having one end rockably and rotatably supported in the housing by a four-point contact bearing or an automatic aligning bearing, and a plurality of balls movably held between an opposite end of the nut assembly and a screw groove defined in the shaft.

14 Claims, 6 Drawing Sheets

ELECTRICALLY ASSISTED POWER STEERING SYSTEM FOR MOTOR VEHICLES

BACKGROUND OF THE INVENTION

1. Field of the Invention

The present invention relates to an electrically assisted power steering system for a motor vehicle such as an automobile.

2. Description of the Prior Art

Electrically assisted power steering systems for use on motor vehicles have a rack shaft which can be axially moved by a pinion meshing therewith when rotary force is applied from a steering wheel through a steering shaft to the pinion. When the rack shaft is axially moved, it causes tie rods coupled to respective ends of the rack shaft to turn road wheels operatively connected to the tie rods. The steering torque applied to the steering shaft is detected, and an electric motor is energized based on the detected value of steering torque. The drive force produced by the electric motor is transmitted to the rack shaft through a ball-and-nut mechanism for thereby giving power assist to the rack shaft in turning the road wheels.

One known electrically assisted power steering system is disclosed in Japanese laid-open patent publication 62-26153 corresponding to U.S. Pat. No. 4,666,014. In such disclosed electrically assisted power steering system, an electric motor is disposed around a rack shaft in a housing in which the rack shaft is slidably supported. Rotary force from the electric motor is transmitted through a ball-and-nut mechanism on the rack shaft.

Because the road wheels apply reactive forces to the rack shaft and the rack shaft suffers dimensional errors introduced when it is manufactured or assembled, the rack shaft tends to be flexed or displaced axially or radially during operation of the electrically assisted power steering system. The ball-and-nut mechanism, whose operation efficiency sharply decreases when subjected to small strains or displacements, cannot directly bear strains or displacements of the rack shaft. In such prior electrically assisted power steering system, the ball-and-nut mechanism is supported in the housing by two thrust bearings which allow the nut to move slightly radially depending on the flexing or strain of the rack shaft.

However, the two thrust bearings make the ball-and-nut mechanism and associated components complex in structure. It is tedious and time-consuming to assemble such ball-and-nut mechanism and associated components in combination with the two thrust bearings. The two thrust bearings also pose limitations on the layout of other members of the electrically assisted power steering system.

SUMMARY OF THE INVENTION

It is an object of the present invention to provide an electrically assisted power steering system for a motor vehicle, which is relatively simple in structure, made up of a relatively small number of parts, and can be assembled with relative ease.

According to the present invention, there is provided an electrically assisted power steering system for a motor vehicle, comprising a housing, a shaft slidably supported in the housing, a ball-and-nut mechanism operatively mounted on the shaft, and an electric motor mounted in the housing for transmitting rotary force from the electric motor through the ball-and-nut mechanism to the shaft. The ball-and-nut mechanism includes a nut assembly disposed around the shaft and having one end rockably and rotatably supported in the housing, and a plurality of balls movably held between an opposite end of the nut assembly and a screw groove defined in the shaft.

The electrically assisted power steering system may further comprise a four-point contact bearing, the nut assembly being rockably and rotatably supported in the housing by the four-point contact bearing.

Alternatively, the electrically assisted power steering system may further comprise an automatic aligning bearing, the nut assembly being rockably and rotatably supported in the housing by the automatic aligning bearing.

The nut assembly may comprise a sleeve disposed around the shaft and having one end rockably supported in the housing, and a nut mounted on an opposite end of the sleeve, the balls being movably held between the nut and the screw groove, the electric motor being disposed around the sleeve.

Alternatively, the nut assembly may comprise a joint pipe disposed around the shaft and having one end rockably supported in the housing, and a nut supported on an opposite end of the joint pipe, the balls being movably held between the nut and the screw groove, the electric motor being disposed around the joint pipe.

The electrically assisted power steering system may further include a resilient member on the joint pipe, the nut being resiliently supported on the joint pipe by the resilient member, or a spherical bushing on the joint pipe, the nut being rockably supported on the joint pipe by the spherical bushing.

The electric motor may comprise a stator and a rotor which are disposed between the nut assembly and the housing, the rotor being rotatable with respect to the stator, the nut assembly being radially spaced from the housing by a minimum distance to keep the rotor and the stator out of contact with each other.

According to the present invention, there is also provided an electrically assisted power steering system comprising a housing, a rack shaft axially extending through the housing for axial sliding movement therein and having opposite ends adapted to be coupled to respective tie rods, a ball-and-nut mechanism including a nut assembly disposed around the shaft and rockably supported in a cantilevered fashion in the housing, and a plurality of balls movably held between the nut assembly and a screw groove defined in the shaft, and an electric motor disposed between the housing and the nut assembly for transmitting rotary force from the electric motor through the ball-and-nut mechanism to the shaft.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
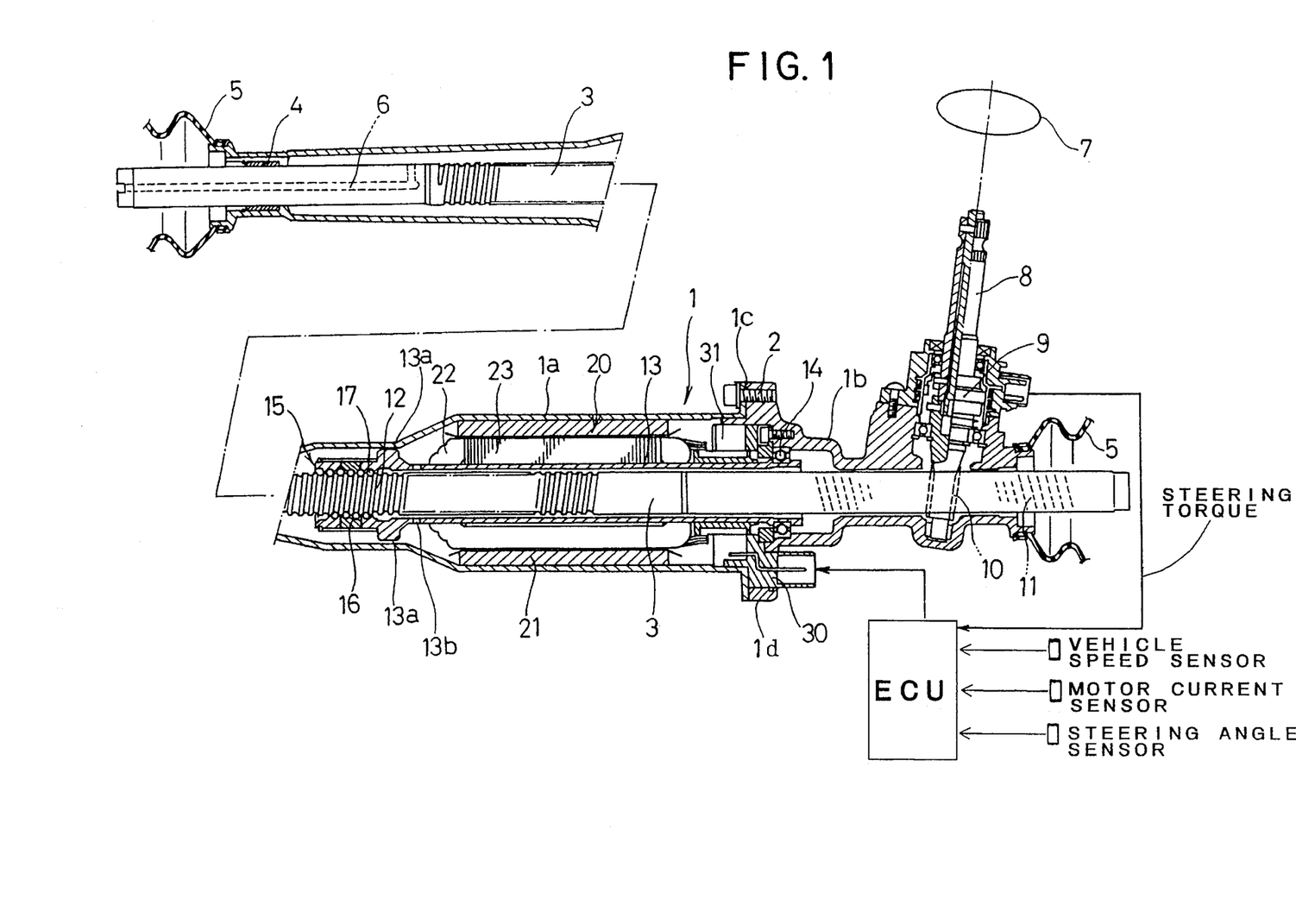
FIG. 1 is a longitudinal cross-sectional view, partly in block form, of an electrically assisted power steering system according to an embodiment of the present invention.
Figure 2:
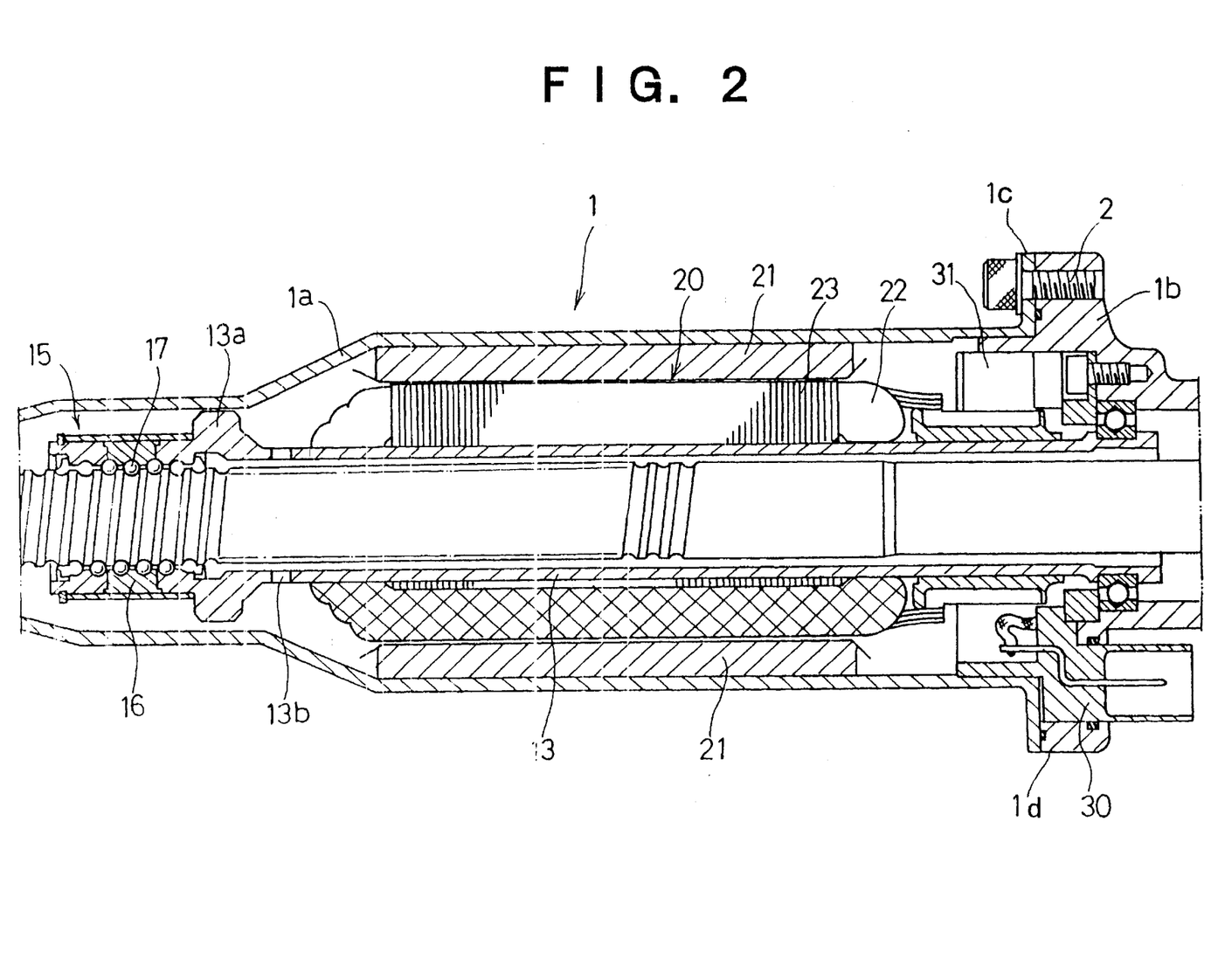
FIG. 2 is an enlarged fragmentary cross-sectional view of the electrically assisted power steering system shown in FIG. 1.

As shown in FIGS. 1 and 2, an electrically assisted power steering system according to an embodiment of the present invention has a housing 1 comprising a left housing member 1a formed by rolling and a right housing member 1b formed by casting. The left and right housing members 1a, 1b having, respectively, end flanges 1c, 1d fastened to each other by a bolt 2. The electrically assisted power steering system also includes a rack shaft 3 axially slidably inserted in and supported by the housing 1 and having opposite ends projecting from outer ends of the housing 1 remote from the end flanges 1c, 1d. The projecting opposite ends of the rack shaft 3 are coupled to tie rods (not shown) which are operatively connected to respective road wheels of a motor vehicle. When the rack shaft 3 is axially moved in the housing 1, the road wheels are steered through the tie rods.

The rack shaft 3 is slidably held by a slide bushing 4 which is fixedly mounted in the outer end of left housing member 1a. Dust boots 5, 5, of an elastomeric material, are mounted on the outer ends, respectively, of left and right housing members 1a, 1b, thus defining a hermetically sealed space in the housing 1 between the dust boots 5, 5. As the rack shaft 3 axially moves, the dust boots 5, 5 are elastically expanded and contracted, varying the volume in the dust boots 5, 5. Air can be introduced into and discharged from the dust boots 5, 5. Air can be introduced into and discharged from the dust boots 5, 5 through bleeding holes 6 (only one shown) defined in the rack shaft 3.

A steering shaft 8, coupled to and rotatable by a steering wheel 7, has a lower end inserted into the right housing member 1b. The inserted lower end of the steering shaft 8 is combined with a steering torque detecting mechanism 9 also disposed in the right housing member 1b. The rack shaft 3 has a rack 11 cut on a surface thereof in the right housing member 1b and held in mesh with a pinion 10 fixedly mounted on the inserted lower end of the steering shaft 8 in the right housing member 1b. A screw groove 12 is helically defined in the rack shaft 3 in the left housing member 1a.

A nut assembly 13, in the form of an elongate sleeve, is disposed around the rack shaft 3, substantially in the left housing member 1a. The nut assembly 13 has an end rotatably supported in the right housing member 1b by a four-point contact bearing 14. The other end of the nut assembly 13 comprises an insert nut 16 of a ball-and-nut mechanism 15. Therefore, the nut assembly 13 is rockably supported in a cantilevered fashion around the shaft 3 in the housing 1. The ball-and-nut mechanism 15 has a plurality of steel balls 17 rotatably held between the insert nut 16 and the screw groove 12. The nut assembly 13 has a pair of diametrically opposite bleeding holes 13b defined therein at a position slightly rightward of the ball-and-nut mechanism 15.

Because only one end of the nut assembly 13 is rotatably supported in the housing 1 by the four-point contact bearing 14, the nut assembly 13 can slightly rock about the supported end. Therefore, the ball-and-nut mechanism 15 on the other end of the nut assembly 13 can easily follow, i.e., can be moved easily by, strains or flexing of the rack shaft 3 which may be caused by reactive forces imposed on the rack shaft 3 by the road wheels. Consequently, the ball-and-nut mechanism 15 is prevented from suffering undue strains from the rack shaft 3 and, hence, the nut assembly 13.

An electric motor 20 is disposed around the nut assembly 13 in the left housing member 1a. Specifically, the electric motor 20 comprises a permanent magnet 21 serving as a stator fixed to the left housing member 1a, which is in the form of an iron casting, and a winding 23 serving as a rotor disposed around an iron core 22 mounted on the nut assembly 13.

Since the winding 23 is mounted on the nut assembly 13, which is slightly rockable, the winding 23 and the permanent magnet 21 would tend to be brought into contact with each other. In this embodiment, the nut assembly 13 has an annular flange 13a projecting radially outwardly near the insert nut 16. When the nut assembly 13 is slightly angularly moved, the annular flange 13a is brought into contact with an inner circumferential surface of the housing 1, before the winding 23 contacts the permanent magnet 21. Actually, therefore, the winding 23 is prevented from contacting the permanent magnet 21.

The electric motor 20 is supplied with an electric current from an external power supply (not shown) through a coupler 30 and a brush 31. Specifically, an electronic control unit (ECU), FIG. 1, determines a voltage to be applied to the electric motor 20 based on signals supplied from the steering torque detecting mechanism 9, a vehicle speed sensor, a motor current sensor, and a steering angle sensor, and energizes the electric motor 20 based on the determined voltage.

When the electric motor 20 is energized, the nut assembly 13 is rotated about its own axis, applying rotary force, through the ball-and-nut mechanism 15, as linear force to the rack shaft 3 for thereby axially moving the rack shaft 3 for assisting in steering the road wheels.

Because only one bearing 14 is used to support the nut assembly 13 at one end thereof, the entire mechanism is relatively simple in structure and made up of a relatively small number of parts. The four-point contact bearing 14, which supports one end of the nut assembly 13, allows the nut assembly 13 to be easily rocked in response to flexing of the rack shaft 3. Furthermore, the annular flange 13a of the nut assembly 13 is radially spaced from the housing 1 by such a distance that the annular flange 13a prevents the winding 23 from contacting the permanent magnet 21 when the nut assembly 13 is angularly moved. Consequently, the electric motor 20 is protected from damage while the electrically assisted power steering system is in operation.

Figure 3:
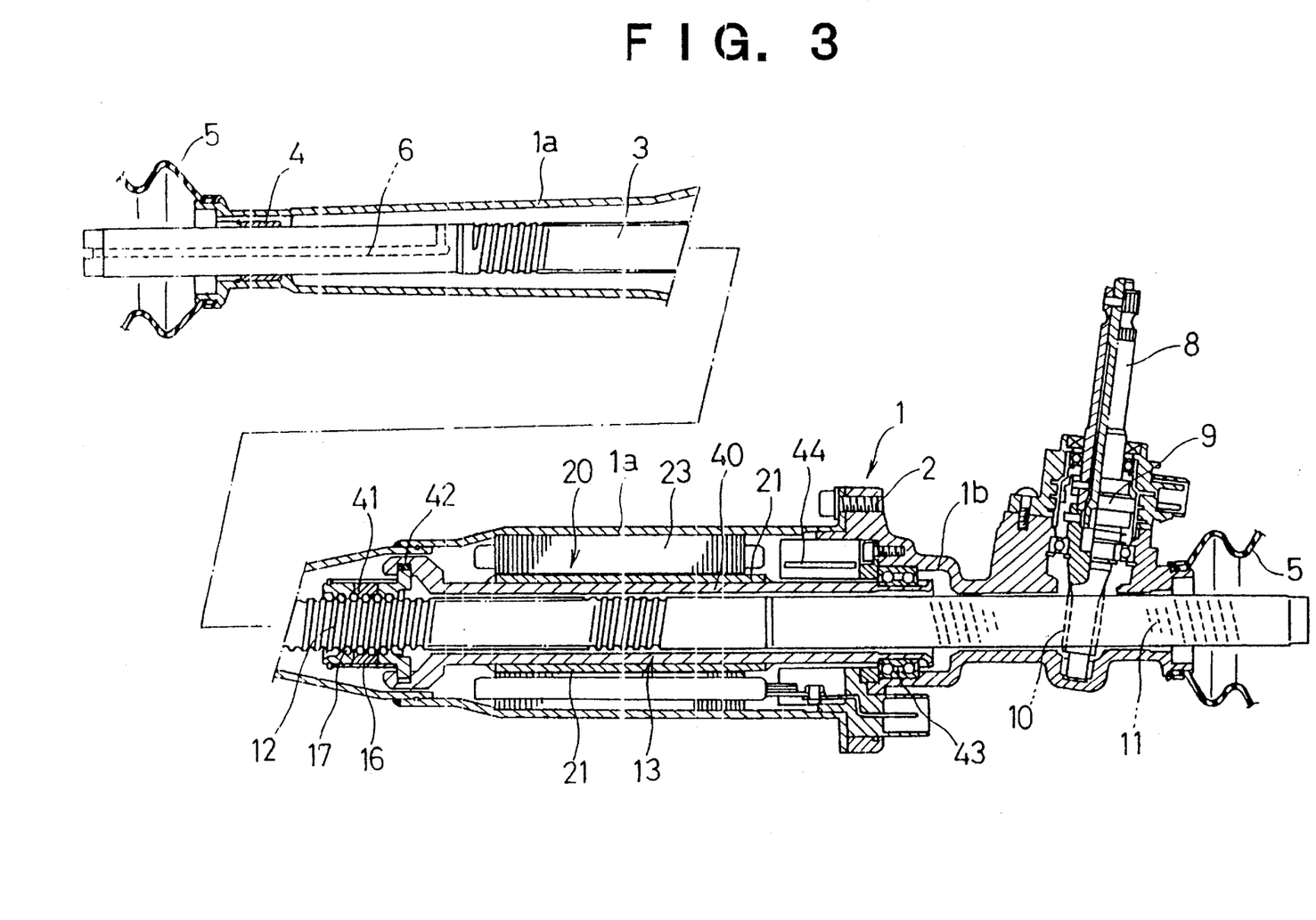
FIG. 3 is a longitudinal cross-sectional view, partly in block form, of an electrically assisted power steering system according to another embodiment of the present invention.
Figure 4:
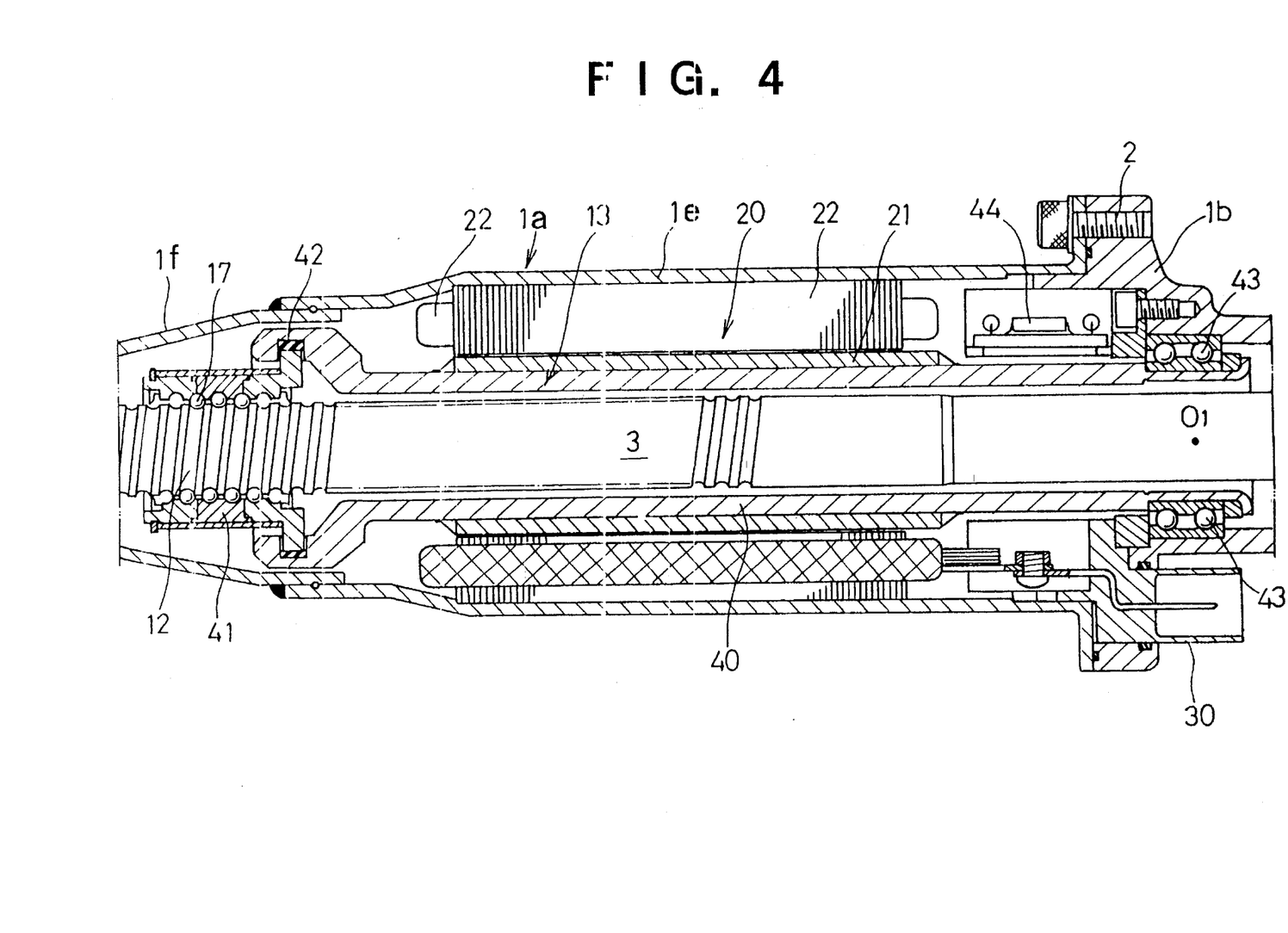
FIG. 4 is an enlarged fragmentary cross-sectional view of the electrically assisted power steering system shown in FIG. 3.

FIGS. 3 and 4 show an electrically assisted power steering system according to another embodiment of the present invention. Those parts shown in FIGS. 3 and 4 which are identical to those shown in FIGS. 1 and 2 are denoted by identical reference numerals, and will not be described in detail below.

In the embodiment shown in FIGS. 3 and 4, the left housing member 1a of the housing 1 is divided into two sub-members 1e, 1f, FIG. 4, which are welded to each other, and the nut assembly 13 comprises a joint pipe 40 and an insert nut 41 coupled to each other with a resilient member 24 interposed therebetween. The insert nut 41 and the steel balls 17 received in the screw groove 12 jointly make up the ball-and-nut mechanism.

The joint pipe 40 has one end angularly movably supported in the housing 1 by an automatic aligning bearing 43.

The nut assembly 13 is slightly rockable about a point 01 at the center of the automatic aligning bearing 43. Because the nut assembly 13 is slightly rockable with respect to the housing 1 and the insert nut 41 is also slightly rockable with respect to the joint pipe 40 by the resilient member 42, the nut assembly 13 has an increased ability to follow flexing or strain of the rack shaft 3.

The electric motor 20 has a stator and a rotor which are inverted in position from those shown in FIG. 2, with no brush employed. Specifically, the permanent magnet 21, as a rotor, is mounted on an outer circumferential surface of the joint pipe 40, and the winding 23, as a stator, is attached to the housing 1. This arrangement makes it possible to omit a brush from the electric motor 20. However, a Hall-effect device 44 is added to detect the rotational phase of the permanent magnet 21 to control an electric current supplied to the winding 23.

Inasmuch as the nut assembly 13, which is slightly rockable with respect to the housing 1, is composed of the joint pipe 40 and the insert nut 41 and is slightly rockable with respect to the joint pipe 40, the nut assembly 13 can easily follow flexing or strain of the rack shaft 3. The automatic aligning bearing 43, which supports one end of the nut assembly 13, permits the nut assembly 13 to rock to an increased degree relatively to the housing 1. Because the nut 41 is supported on the joint pipe 40 by the resilient member 42, a radial or angular displacement or positional error of the nut 41, with respect to the housing 1, can be absorbed by the resilient member 41.

Figure 5:
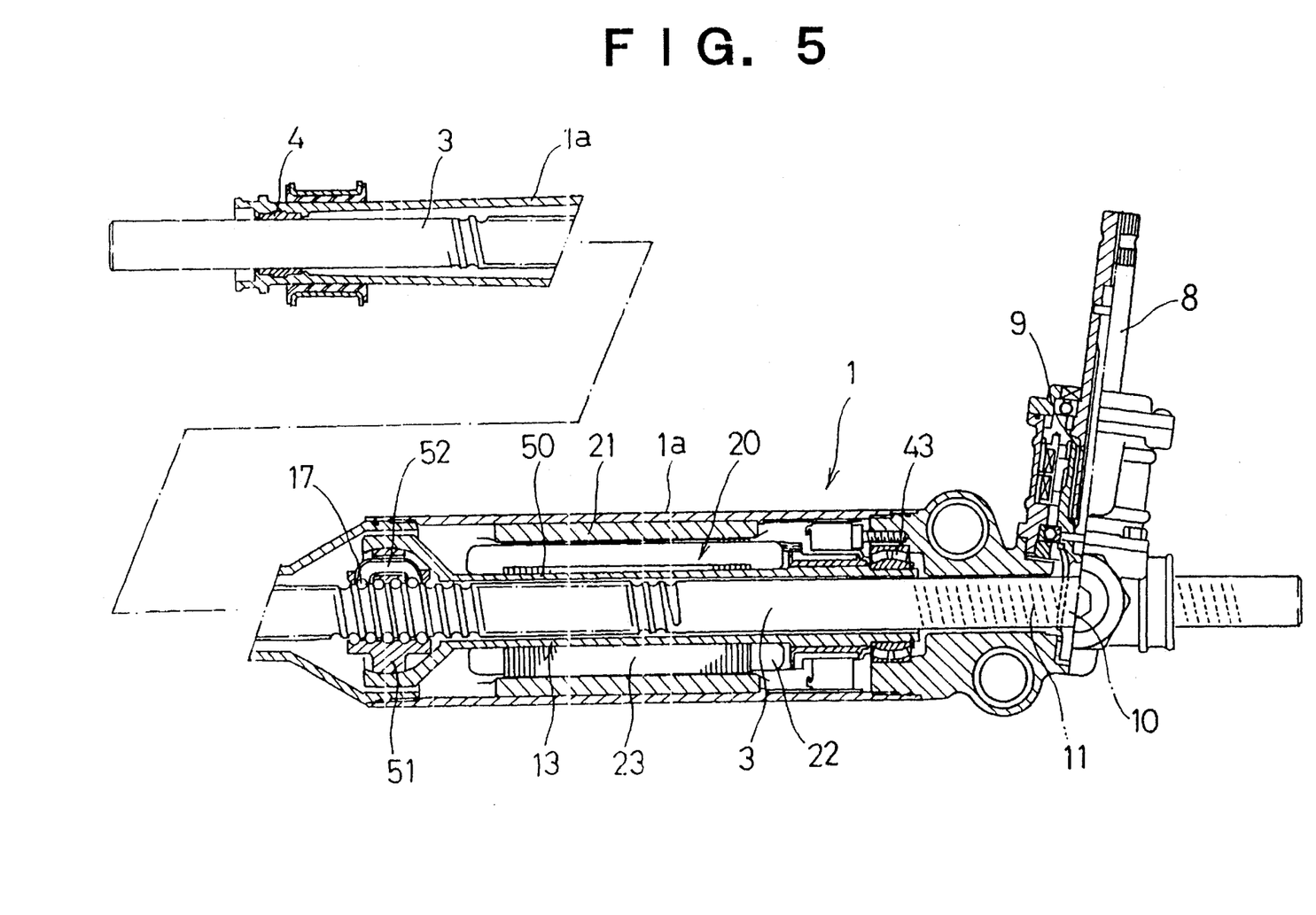
FIG. 5 is a longitudinal cross-sectional view, partly in block form, of an electrically assisted power steering system according to still another embodiment of the present invention.
Figure 6:
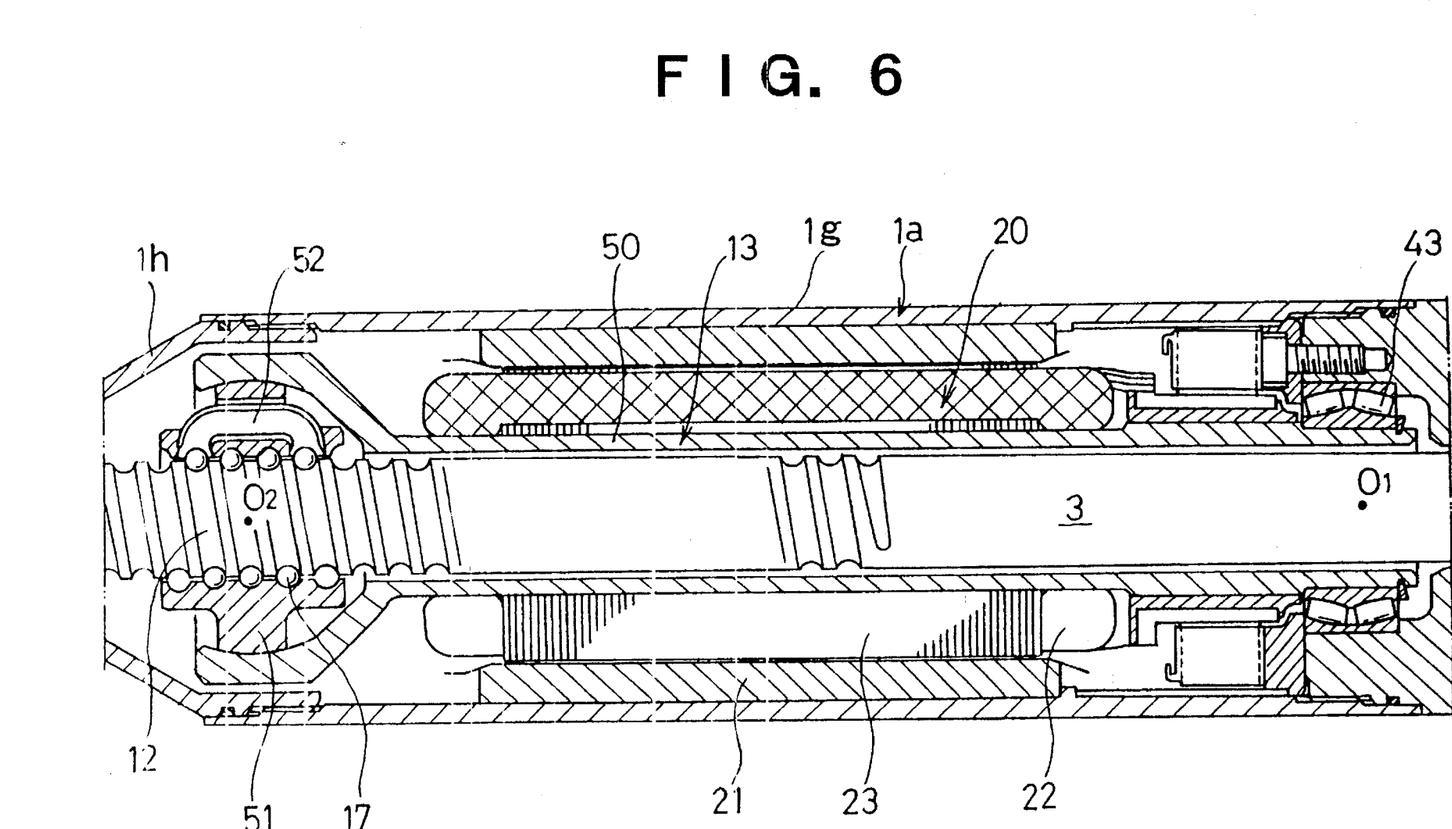
FIG. 6 is an enlarged fragmentary cross-sectional view of the electrically assisted power steering system shown in FIG. 5.

FIGS. 5 and 6 show an electrically assisted power steering system according to still another embodiment of the present invention. Those parts shown in FIGS. 5 and 6 which are identical to those shown in FIGS. 1 through 4 are denoted by identical reference numerals, and will not be described in detail below.

In this embodiment, the left housing member 1a of the housing 1 is divided into two submembers 1g, 1h, FIG. 6, which are held in threaded engagement with each other, and the nut assembly 13 comprises a joint pipe 50 and a nut 51. The joint pipe 50 is slightly rockably supported at one end in the housing 1 by an automatic aligning bearing 43 for rocking movement about a point 01 at the center of the automatic aligning bearing 43. The nut 51 is slightly rockably held in the opposite end, shaped as a spherical bushing, of the joint pipe 50 for rocking movement about a point 02. The spherical bushing of the joint pipe 50 allows an angular displacement or positional error to be absorbed between the nut 51 and the housing 1. The nut 51 and the steel balls 17, received in the screw groove 12, jointly make up the ball-and-nut mechanism. The nut 51 has a ball return passage 52 defined therein for circulating the steel balls 17 back to the screw groove 12 after the nut 51 has made three revolutions around the rack shaft 3.

Although there have been described what are at present considered to be the preferred embodiments of the invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

What is claimed is:

1. An electrically assisted power steering system for a motor vehicle, comprising:

a housing;

a shaft slidably supported in said housing;

a ball-and-nut mechanism operatively mounted on said shaft; and an electric motor mounted in said housing for transmitting rotary force from said electric motor through said ball-and-nut mechanism to said shaft;

a sleeve disposed around said shaft and being rockably and rotatably supported at a single end in said housing in a cantilevered fashion, said ball-and-nut mechanism including a nut mounted on an opposite end of said sleeve, rockable with said sleeve, and disposed freely with respect to said housing, and a plurality of balls movably held between said nut and a screw groove defined in said shaft; and wherein said electric motor is disposed around said sleeve.

2. An electrically assisted power steering system according to claim 1, further comprising a four-point contact bearing, wherein said sleeve is rockably and rotatably supported in said housing by said four-point contact bearing.

3. An electrically assisted power steering system according to claim 1, further comprising an automatic aligning bearing, wherein said sleeve is rockably and rotatably supported in said housing by said automatic aligning bearing.

4. An electrically assisted power steering system according to claim 1, wherein said sleeve is a joint pipe disposed around said shaft rockably supported in said housing.

5. An electrically assisted power steering system according to claim 4, further including a resilient member on said joint pipe, said nut being resiliently supported on said joint pipe by said resilient member.

6. An electrically assisted power steering system according to claim 4, further including a spherical bushing on said joint pipe, said nut being rockably supported on said joint pipe by said spherical bushing.

7. An electrically assisted power steering system according to claim 1, wherein said electric motor comprises a stator and a rotor which are disposed between said sleeve and said housing, said rotor being rotatable with respect to said stator, said sleeve being radially spaced from said housing by a minimum distance to keep said rotor and said stator out of contact with each other.

8. An electrically assisted power steering system according to claim 1, wherein said shaft comprises a rack shaft having opposite ends for coupling to tie rods, respectively.

9. An electrically assisted power steering system comprising:

a housing;

a rack shaft axially extending through said housing for axial sliding movement therein and having opposite ends for coupling to respective tie rods;

a sleeve disposed around said shaft and rockably supported at a single end in a cantilevered fashion in said housing, a ball-and-nut mechanism including a nut mounted at an opposite end of said sleeve, rockable with said sleeve, and disposed freely with respect to said housing, and a plurality of balls movably held between said nut and a screw groove defined in said shaft; and an electric motor disposed within said housing and around said sleeve for transmitting rotary force from said electric motor through said ball-and-nut mechanism to said shaft.

10. An electrically assisted power steering system according to claim 9, further comprising a four-point contact bearing, said sleeve being rockably and rotatably supported in said housing by said four-point contact-bearing.

11. An electrically assisted power steering system according to claim 9, further comprising an automatic aligning bearing, said sleeve being rockably and rotatably supported in said housing by said automatic aligning bearing.

12. An electrically assisted power steering system according to claim 9, wherein said sleeve comprises a joint pipe disposed around said shaft and rockably supported in the cantilevered fashion in said housing, and the nut supported on said joint pipe, said balls being movably held between said nut and said screw groove, said electric motor being disposed around said joint pipe.

13. An electrically assisted power steering system according to claim 12, further including a resilient member on said joint pipe, said nut being resiliently supported on said joint pipe, by said resilient member.

14. An electrically assisted power steering system according to claim 12, further including a spherical bushing on said joint pipe, said nut being rockably supported on said joint pipe by said spherical bushing.

* * * * *